Oct. 7, 1941.   A. R. BOZARTH   2,258,441
MANUFACTURE OF ANTIMONY OXIDES
Filed Dec. 27, 1939
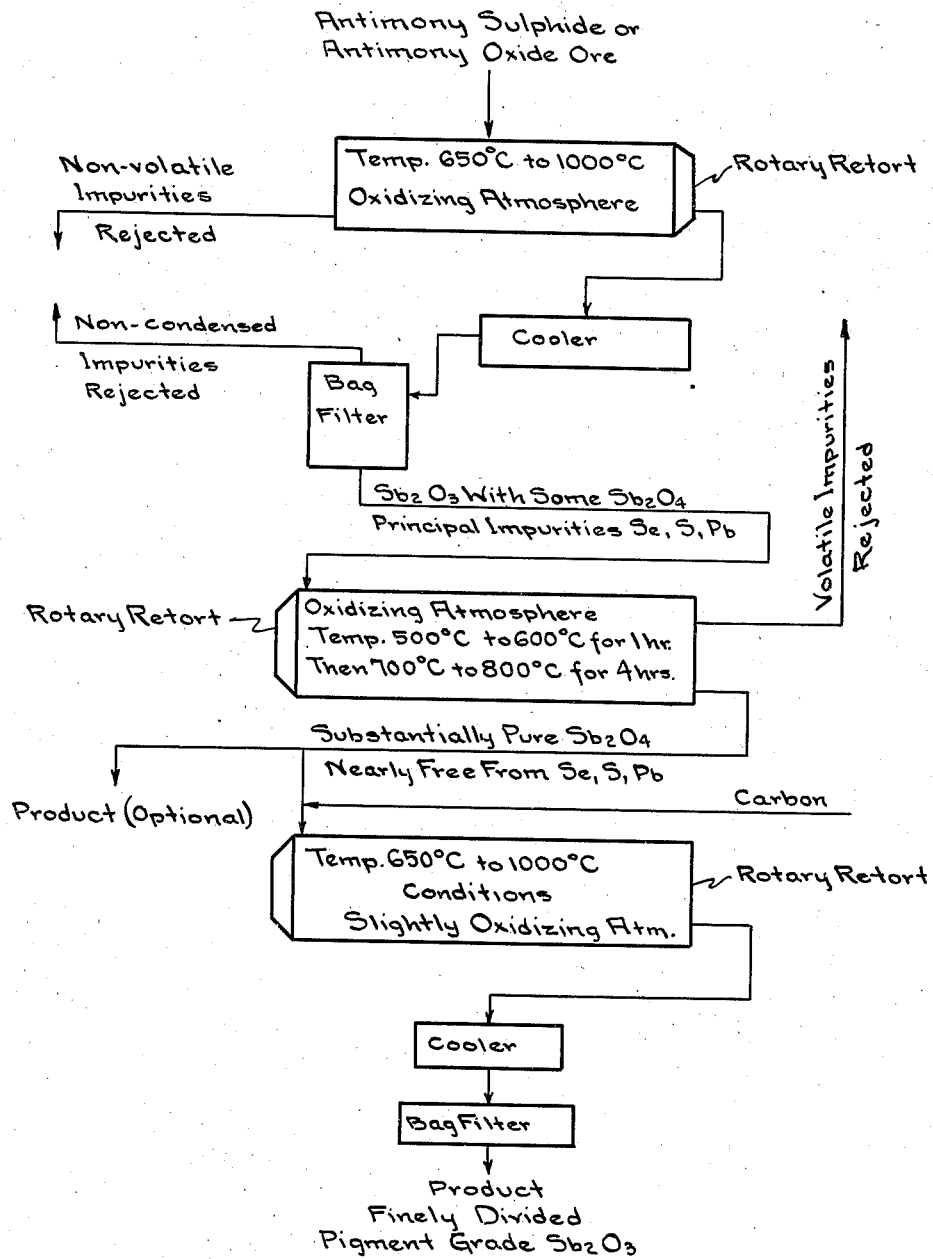
A.R. Bozarth  INVENTOR.
BY William H Brown
ATTORNEY.

Patented Oct. 7, 1941

2,258,441

UNITED STATES PATENT OFFICE 2,258,441

MANUFACTURE OF ANTIMONY OXIDES

Abe R. Bozarth, Cleveland, Ohio, assignor to The Harshaw Chemical Company, Elyria, Ohio, a corporation of Ohio Application December 27, 1939, Serial No. 311,143

9 Claims. (Cl. 23—144)

This invention relates to the production of antimony compounds of high purity and more particularly to the conversion of an impure grade of $Sb_2O_3$, that is, one which contains impurities such as sulfur, selenium and lead, and is not in proper physical state for pigment use, to a purified grade in finely divided state and white enough for pigment and ceramic purposes.

It has been common practice to produce pigment grade antimony oxide ($Sb_2O_3$) by oxidizing pure antimony metal. This method, although productive of an excellent product, is expensive and, therefore, a simple, effective and relatively inexpensive process of producing this grade antimony oxide is needed.

I have now discovered that antimony compounds of high purity can be produced from impure antimony values very cheaply and very simply by effecting the separation of the antimony values from the volatilizable and the non-volatilizable impurities in separate operations, the volatilizable impurities being removed by volatilization while the antimony is in the form of the tetroxide and the non-volatilizable impurities being removed by volatilizing the antimony in the form of the trioxide. The latter of these operations is, of course, old, per se. Antimony tetroxide, in finely divided form, that is, in pulverulent or granular form, can be heated well above the melting point of antimony trioxide and remain in finely divided form. For this reason, impurities which cannot be volatilized out of antimony trioxide can easily be removed from antimony tetroxide as gases or vapors. So far as I am aware, no one prior to my invention has appreciated the advantages to be derived from these properties of antimony tetroxide as set forth and claimed herein. Indeed, I am not aware that the properties themselves have been fully understood heretofore.

Accordingly, my invention contemplates the novel process as broadly stated foregoing and as stated in the various claims appended hereto.

In the drawing, the figure is a flow diagram of the preferred embodiment of the invention.

*First step.*—In the preferred practice of the invention, I first heat the starting material, which may be an impure antimony oxide or sulfide, such as an ore or previously processed impure material containing non-volatilizable impurities. This material is heated in an oxidizing atmosphere, preferably not departing more than necessary from neutral, under temperature conditions such as to volatilize the antimony trioxide, and the vapors are then condensed. This step results in the production of $Sb_2O_3$ containing mainly selenium, $SO_3$ and lead as impurities. If, as a starting material, I use antimony values which do not contain any non-volatilizable impurities, this first step may be omitted. The kiln temperature may vary from 650° C. to 1000° C., but is preferably kept between 700° C. and 800° C., most desirably approximately 800° C.

*Second step.*—I then heat the impure $Sb_2O_3$ in an oxidizing atmosphere at a temperature below the melting point of $Sb_2O_3$, that is, below 650° C., preferably in the range 500° C. to 600° C., and most desirably at approximately 550° C. Under these conditions, the $Sb_2O_3$ is oxidized, without melting, to $Sb_2O_4$ which remains in the form of a fluffy powder. The temperature should not be allowed to go above the melting point of $Sb_2O_3$ until oxidation to $Sb_2O_4$ is complete. After oxidation is complete, the temperature may be raised to any desired point short of the decomposition temperature of $Sb_2O_4$, which is about 1000° C. Inasmuch as $Sb_2O_4$ has an appreciable vapor pressure and local overheating is possible, it is not desirable to approach too closely to its decomposition temperature even after oxidation is complete. I prefer to oxidize between 500° C. and 600° C. and then raise the temperature to a point not exceeding 900° C. preferably between 700° C. and 800° C. The oxidation may occupy from 1 to 2 hours, and I may then heat at the higher temperature for from 1 to 3 hours, preferably from 2 to 3 hours, in order to reduce as far as possible the quantities of impurities.

I am not certain as to the state in which the sulfur, selenium, lead, etc. are present in the $Sb_2O_3$ nor in what manner they are eliminated, but I believe that they are present in $Sb_2O_3$ in some state of solid solution or chemical combination and that under the conditions above described, they are volatilized and eliminated as gaseous oxides in the case of sulfur and selenium, and as a basic sulfate in the case of lead.

While I prefer to carry out this second step in the manner indicated above, it is obvious that the advantages of the invention may be realized in some degree by operating at a single temperature instead of at two temperatures. Thus, by the treatment below the melting point of $Sb_2O_3$, the impurities are removed to a considerable extent and extended heating at such temperature would remove more. On the other hand, heating above the melting point of $Sb_2O_3$ would remove impurities to a large extent but would result in loss of antimony.

*Third step.*—The substantially pure $Sb_2O_4$ is then mixed with carbon or other suitable reducing agent under conditions to reduce the $Sb_2O_4$ to $Sb_2O_3$. This result is best obtained by mixing just the proper amount of substantially pure, finely divided carbon such as lamp black, ground wood charcoal or the like and heating at a temperature sufficient to volatilize the $Sb_2O_3$ as it is formed. The retort in which this operation is carried out is placed under suction so as to withdraw $Sb_2O_3$ as formed and this product is cooled so as to precipitate a very finely divided material.

Alternatively, I may conduct the first step under sufficiently highly oxidizing conditions to form the tetroxide from, for example, the sulfide ore, prolonging the heating to remove the volatilizable impurities such as sulfur, selenium and lead, thereby producing a product containing only non-volatilizable impurities, and then reduce the tetroxide to the trioxide under conditions to fume off the latter as formed, leaving the non-volatilizable impurities behind.

Obviously, if the third step is omitted, the process is well adapted to the production of highly pure antimony tetroxide.

*Example*

Stibnite was heated in a rotary retort at a temperature held between 800° C. and 1000° C. and in an oxidizing atmosphere until the antimony content had been fumed off in the form of $Sb_2O_3$. This $Sb_2O_3$ and other gases produced therewith were passed into a cooler and bag filter where the $Sb_2O_3$ and some impurities were collected. Uncondensed impurities, mainly $SO_2$, were removed. The $Sb_2O_3$, now free of non-volatilizable impurities was roasted at a temperature maintained between 500° C. and 600° C. in an oxidizing atmosphere for a period of 2 hours until the $Sb_2O_3$ was converted to $Sb_2O_4$. The temperature was then raised to and maintained between 750° C. and 850° C. for a period of 3 hours. The substantially pure $Sb_2O_4$ was then mixed with wood charcoal in theoretical quantity required to reduce the $Sb_2O_4$ to $Sb_2O_3$ and heated to a temperature of 800° C. to 1000° C. whereby the $Sb_2O_4$ was reduced to $Sb_2O_3$ and fumed off as formed. The $Sb_2O_3$ was condensed and recovered as a pure white finely divided product containing less than 0.1% sulfur, less than 0.01% selenium, and less than 0.1% lead.

Having thus described my invention, what I claim is:

1. A method of producing pure antimony compounds comprising removing volatilizable and non-volatilizable impurities from antimony values by separate operations, volatilizable impurities including one or more elements of the class consisting of sulfur, selenium and lead, being removed by volatilization while the antimony is in the form of the tetroxide, and non-volatilizable impurities being removed by volatilizing the antimony in the form of the trioxide, whereby such impurities are left behind, the volatilized antimony trioxide being condensed at a place spaced from such non-volatilizable impurities.

2. In a process for producing a pure antimony trioxide, the steps of heating antimony tetroxide, containing one or more impurities of the class consisting of sulfur, selenium and lead, under oxidizing conditions to volatilize such impurity or impurities, removing the volatilized impurities from the antimony tetroxide and then reducing the so purified tetroxide to the trioxide.

3. In a process for producing a pure antimony trioxide, the steps of heating pulverulent antimony tetroxide, containing one or more impurities of the class consisting of sulfur, selenium and lead, under oxidizing conditions to volatilize such impurity or impurities and then reducing the so purified tetroxide to the trioxide.

4. In a process for producing a pure antimony trioxide, the steps of heating antimony tetroxide, containing one or more impurities of the class consisting of sulfur, selenium and lead, under oxidizing conditions and above the melting point of $Sb_2O_3$ to volatilize such impurity or impurities and then reducing the so purified tetroxide to the trioxide.

5. In a process for producing a pure antimony trioxide, the steps of heating pulverulent antimony tetroxide, containing one or more impurities of the class consisting of sulfur, selenium and lead, under oxidizing conditions and above the melting point of $Sb_2O_3$ to volatilize such impurity or impurities and then reducing the so purified tetroxide to the trioxide.

6. A process of purifying antimony trioxide, containing one or more impurities of the class consisting of sulfur, selenium and lead, comprising the steps of converting the same to the tetroxide by heating under oxidizing conditions below the melting point of the trioxide, then elevating the temperature to a point above the melting point of the trioxide but below the decomposition temperature of the tetroxide maintaining such elevated temperature while removing the volatilized impurities until the desired purity is attained and then reducing the substantially pure tetroxide to the trioxide.

7. A method of producing substantially pure antimony tetroxide comprising oxidizing antimony trioxide to the tetroxide by heating under oxidizing conditions below the melting point of the trioxide until the oxidation is substantially complete, thereby forming a pulverulent, finely divided tetroxide and then heating the resulting tetroxide under oxidizing conditions at a temperature above the melting point of the trioxide and below the decomposition temperature of the tetroxide whereby to remove impurities by volatilization.

8. In purification of antimony values, that improvement which comprises removing volatilizable impurities by heating antimony tetroxide containing such impurities under oxidizing conditions at a temperature above 650° C. and below 1000° C.

9. In purification of antimony values, that improvement which comprises the steps of converting finely divided antimony trioxide containing volatilizable impurities into finely divided antimony tetroxide by heating in an oxidizing atmosphere below 650° C. and then removing volatilizable impurities by heating in an oxidizing atmosphere at a temperature above 650° C. and below 1000° C.

ABE R. BOZARTH.